United States Patent [19]

Fukuda

[11] Patent Number: 5,050,456

[45] Date of Patent: Sep. 24, 1991

[54] AUTOMATIC SPEED CHANGING APPARATUS FOR VEHICLE

[75] Inventor: Masao Fukuda, Saitama, Japan

[73] Assignee: Kabushiki Kaisha Komatsu Seisakusho, Tokyo, Japan

[21] Appl. No.: 415,340

[22] PCT Filed: Jan. 27, 1989

[86] PCT No.: PCT/JP89/00079

§ 371 Date: Sep. 14, 1989

§ 102(e) Date: Sep. 14, 1989

[87] PCT Pub. No.: WO89/07057

PCT Pub. Date: Aug. 10, 1989

[30] Foreign Application Priority Data

Jan. 29, 1988 [JP] Japan .............................. 63-9543[U]

[51] Int. Cl.⁵ .............................................. B60K 41/08
[52] U.S. Cl. ......................................... 74/866; 74/878
[58] Field of Search ................................. 74/878, 866

[56] References Cited

U.S. PATENT DOCUMENTS

| | | | |
|---|---|---|---|
| 4,414,863 | 11/1983 | Heino | 74/878 |
| 4,425,620 | 1/1984 | Batcheller et al. | 74/866 |
| 4,648,290 | 3/1987 | Dunkley et al. | 74/866 |
| 4,776,239 | 10/1988 | Sassi et al. | 74/866 |
| 4,815,341 | 3/1989 | Ohkubo et al. | 74/878 |
| 4,829,852 | 5/1989 | Sakakiyama | 74/866 |
| 4,852,006 | 7/1989 | Speranza | 74/866 |
| 4,858,498 | 8/1989 | Bouda | 74/878 |
| 4,914,983 | 4/1990 | Simonyi et al. | 74/866 |
| 4,916,979 | 4/1990 | Irwin | 74/866 |
| 4,916,983 | 4/1990 | Amrein et al. | 74/878 |

FOREIGN PATENT DOCUMENTS 2918856 11/1980 Fed. Rep. of Germany ........ 74/878

Primary Examiner—Allan D. Herrmann
Assistant Examiner—Ryan W. Massey
Attorney, Agent, or Firm—Spensley Horn Jubas & Lubitz

[57] ABSTRACT

An automatic speed changing apparatus for a vehicle for automatically controlling speed change in connection with movement of the vehicle, wherein a hold switch (180) for making a designation as to whether a hold processing, i.e., a processing of automatically holding the gear position (speed stage) of a transmission (160) selected at this time point should be executed or not is provided for a controller (130) for the automatic transmission apparatus independently of actuating levers (111, 112) in the form of a select lever or the like so that the controller executes the hold processing in response to actuation of a hold switch. In case where movement of the vehicle is shifted from forward movement to rearward movement and vice versa after the hold switch is actuated, the transmission is once forcibly shifted to a second speed stage (representative of a shift change) when the vehicle starts its movement, and thereafter when the vehicle speed is increased to reach a required speed stage which has been held, the required speed stage is automatically maintained as a result of the hold processing. With this construction, the automatic speed changing apparatus permits a work to be smoothly conducted at a high efficiency for a construction machine such as a wheel loader or the like vehicle.

2 Claims, 7 Drawing Sheets

AUTOMATIC SPEED CHANGING APPARATUS FOR VEHICLE

TECHNICAL FIELD

The present invention relates generally to an automatic speed changing apparatus for a vehicle wherein speed changing in connection with movement of the vehicle is automatically controlled and more particularly to improvement of an automatic speed changing apparatus preferably employable for a transmission mounted on a tire type construction machine such as a wheel loader or the like vehicle.

BACKGROUND ART

FIG. 1 schematically illustrates a technical concept representing a conventional automatic speed changing apparatus which has been employed for a passenger car, a truck or the like vehicle.

As shown in FIG. 1, the automatic speed changing apparatus is usually constructed such that the content of actuations of a select lever device 10 and an acceleration pedal 20 is inputted into a controller 30 comprising computers 31 and 32, and a rotational speed of an engine 40, a manner of turning on or off a clutch 50 and a manner of shifting gears in a transmission 60 are controlled to match the content of actuations of the select lever device 10 and the acceleration pedal 20.

Here, the select lever device 10 is such that a select lever signal representative of the content corresponding to the actuation position is outputted in response to shifting actuation of a select lever 11 in the direction of an arrow mark F1 in the drawing. For example, when the select lever 11 is actuated to a "R (reverse)" position, a select lever signal representative of "rearward movement of a vehicle movement of the vehicle in the rearward direction)" is outputted, when it is actuated to a "N (neutral)" position, a select lever signal representative of "parking and initiating of engine start" is outputted and when it is actuated to a "D (drive)" position, a select lever signal signal representative of "forward movement" is outputted from the select lever device 10. Particularly, when the select lever 11 is located at the position "D" representing "forward movement", the engine 40 (precisely speaking, an electronic governor 41 incorporated in the engine 40) and the transmission 60 (precisely speaking, a solenoid valve 61 usable for the purpose of shifting gears) are controlled via the controller 30 so that automatic speed changing is effected within the range of, e.g., second speed to fifth speed.

When the select lever 11 is actuated to a position representing "HOLD", a select lever signal representing "maintaining the gear position in the transmission 60 at this time point" is outputted from the select lever device 10. In this case, the gear position which has been selected via the solenoid valve 61 at this time point is maintained in the transmission 60. Namely, the vehicle is then caused to move while a constant speed stage which has been selected is maintained.

In addition, when the select lever 11 is actuated to the position "HOLD", actuation of the select lever 11 in the direction of an arrow mark F2 in the drawing makes it possible to perform a manual speed changing operation. If the select lever 11 is actuated in the direction of, e.g., "DOWN", a select lever signal representing "manual shift down" is outputted from the select lever device 10, whereby the transmission 60 is brought in meshing engagement with speed reduction gears. If the select lever 11 is actuated in the direction of "UP", a select lever signal representing "manual shift up" is outputted from the select lever device 10, whereby the transmission 60 is brought in meshing engagement with speed increase gears.

In connection with the select lever device 10, reference numeral 13 designates an inching switch for commanding movement of the vehicle at a very low speed by a depressing operation without actuation of an acceleration pedal, reference numeral 14 is an "ECON (economy)" switch for commanding so-called economic movement of the vehicle by a depressing operation, reference numeral 15 does a "PWR (power)" switch for commanding so-called powerful movement of the vehicle (movement of the vehicle with high output) by a depressing operation and reference numeral 16 does a "1st (first)" switch for commanding start of movement of the vehicle at a first speed at the "D" position of the select lever 11 by a depressing operation.

FIG. 2 is a flowchart which summarily illustrates a manner of performing the aforementioned controlling operation in relation to the hold processing of the automatic speed changing apparatus (particularly, the controller 30), i.e., a processing to be performed when the select lever 11 is actuated to the "HOLD" position.

As shown in FIG. 2, with the automatic speed changing apparatus as described above, the hold processing is executed under conditions that speed changing is controlled unless the select lever 11 is actuated to the "HOLD" position and the select lever 11 is actuated by no means in the direction of the arrow mark F2 once it has been actuated to the "HOLD" position. The hold processing permits the current speed stage of the transmission 60 (which has been selected at this time point) to be maintained, as mentioned above.

When the select lever 11 is shifted to the "R" position during the hold processing, i.e., when movement of the vehicle is shifted from F (forward movement) to R (rearward movement), the hold processing is naturally canceled, whereby automatic speed changing is performed while the "rearward movement" state is maintained, unless the select lever 11 is actuated to the "HOLD" position again.

When the select lever 11 is actuated further in the direction of the arrow mark F2 while it is actuated to the "HOLD" position, "manual speed changing" is performed in the direction of shift-down or in the direction of shift-up in correspondence to the direction of actuation of the select lever 11, as mentioned above.

Since the automatic speed changing apparatus assures that movement of the vehicle can be excellently stabilized by virtue of the hold function provided in that way and moreover fatigue of a driver (operator) can be minimized, the automatic speed changing apparatus is very significant for a passenger car, a truck or the like vehicle of which movement is comparatively minimally shifted from forward movement to rearward movement and vice versa but employment of the automatic speed changing apparatus is still problematical for a construction machine such as a wheel loader or the like which is designed and constructed in the form of a vehicle having tires used therefor in the same manner as the aforementioned vehicles.

Specifically, since a construction machine such as a wheel loader or the like is such that its movement is often shifted from F (forward movement) to R (rearward movement) and vice versa, as will be apparent from consideration of its utilization, employment of the automatic speed changing apparatus for the construction machine leads to the following malfunctions. Accordingly, work can not be conducted at a high efficiency in spite of employment of the automatic speed changing apparatus. (1) Although the automatic speed changing apparatus can be held at a specific speed stage suitable for conducting a certain work, this hold state should be canceled soon (per every shifting operation from F to R and vice versa). (2) Once the hold state is canceled, it is required that movement of the vehicle is once shifted up to the preceding speed stage and then a hold processing (representing a processing of actuating the select lever 11 to the "HOLD" position) is performed again in order that the automatic speed changing apparatus is held at the preceding speed stage again. (3) A holding processing to be repeatedly performed per every shifting operation from F to R and vice versa is very complicated and incorrect operation is liable to occur.

The present invention has been made with the foregoing background in mind and its object resides in providing an automatic speed changing apparatus for a vehicle in the form of a construction machine such as a wheel loader or the like which assures that a hold processing can always be executed at a high efficiency while the work load of the operator (driver) is reduced.

DISCLOSURE OF THE INVENTION

According to the present invention, switch means, i.e., a hold switch for making a designation as to whether a hold processing should be executed or not is provided for a controller of the automatic speed changing apparatus independently of actuation levers in the form of a select lever or the like so that the controller executes a hold processing, i.e., a processing of automatically holding a gear position (speed stage) in the transmission which has been selected at this time point.

Consequently, once a required speed stage has been held by actuating the hold switch, movement of a vehicle can immediately be achieved in an automatic manner at the required speed stage merely by shifting movement of the vehicle from forward movement to rearward movement and vice versa. This enables an operation to be performed at a high efficiency using a construction machine such as a wheel loader or the like vehicle.

Further, according to the present invention, in case where movement of the vehicle is shifted from forward movement to rearward movement and vice versa after the hold switch is actuated, when it is automatically shifted to the required speed stage which has been held in that way, i.e., when the vehicle starts its movement in accordance with a "hold" mode irrespective of forward movement or rearward movement, the transmission is once forcibly shifted to a second speed stage (representative of a shift change), and thereafter when movement of the vehicle reaches the required speed stage which has been held as the vehicle speed is increased, the hold processing is executed so as to automatically hold this speed stage.

Consequently, when the vehicle moves at the required speed stage after movement of the vehicle is shifted from forward movement to rearward movement and vice versa, shifting to the required speed stage can always be achieved with stability and smoothly.

BEST MODE FOR CARRYING OUT THE INVENTION

Now, the present invention will be described in detail below with reference to the accompanying drawings, particularly, FIGS. 3 to 6 which illustrate an embodiment thereof.

This embodiment will be described below on the assumption that a wheel loader is employed as a vehicle to which this present invention is applied. For the reason, an automatic speed changing apparatus according to the illustrated embodiment will be described hereinafter as an apparatus for automatically controlling a speed changing operation in relation to a speed of movement of the wheel loader.

Figure 3:
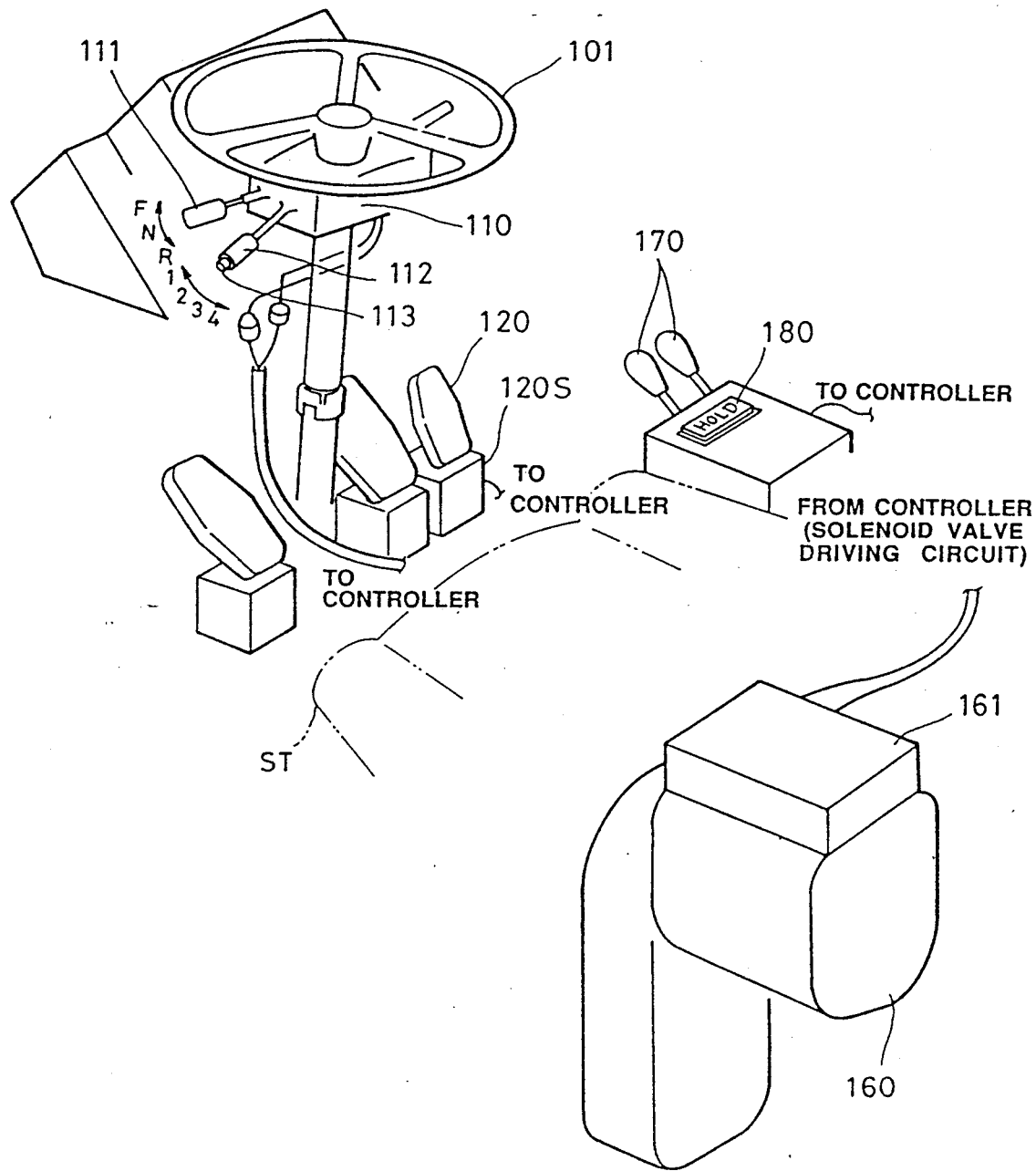
FIG. 3 is a perspective view illustrating an actuating section and a section to be controlled in the automatic speed changing apparatus for a vehicle in accordance with an embodiment of the present invention.

FIG. 3 is a perspective view which schematically illustrates the structure of a driver seat section and objects to be controlled in a wheel loader, i.e., a transmission section to be controlled by the automatic speed changing apparatus of the present invention. In FIG. 3, numeral 101 designates a steering handle, reference numeral 110 is a lever device, reference numeral 111 is a forward/rearward shifting lever arranged on the lever device 110 to perform a shifting operation of shifting from F (forward movement) to R (rearward movement) of a vehicle and vice versa as reprsented by arrow marks in the drawing, reference numeral 112 is a speed stage shifting lever likewise arranged on the lever device 110 to perform a shifting operation for shifting to a required speed stage for the vehicle as represented by arrow marks in the drawing, reference numeral 113 is an automatic speed changing/manual speed changing shifting lever provided at the fore end of the speed stage shifting lever 112 to perform a shifting operation from an "automatic speed changing" mode to a "manual speed changing" mode and vice versa in response to an ON-OFF actuation of the speed stage shifting lever 112, reference numeral 120 is an acceleration pedal, reference numeral 120S is an acceleration pedal position detecting sensor for detecting a position assumed by the acceleration pedal 120, reference symbol ST is a driver's seat, reference numeral 170 does a working machine actuating lever arranged in the proximity of the driver's seat ST and reference numeral 180 does a hold switch arranged likewise in the proximity of the seat ST to issue a command to a controller (precisely speaking, a solenoid valve driving circuit) to be described later in response to the ON-OFF actuation of the speed stage shifting lever 112 as to whether the hold mode processing, i.e., a processing of automatically holding the gear position (representative of the speed stage) which has been selected at this time point by a transmission 160 as shown in FIG. 3 should be executed or not. Incidentally, reference numeral 161 designates a solenoid valve mounted on the transmission 160 to shift the gear position (speed stage) in the transmission 160. The forward movement/rearward movement shifting lever 111 is provided with a sensor 111S for detecting the current shifted position and the speed stage shifting lever 112 is provided with a sensor 112S for detecting the current shifted position (in practice, these sensors 111S and 112S are incorporated in the lever device 110), although they are not shown in FIG. 3. Specifically, the speed stage shifting lever 112 is used for both modes, i.e., "automatic speed changing" mode and "manual speed changing" mode, and in the case where the speed stage shifting lever 112 is actuated to, e.g., a position "3", an automatic speed changing operation can be performed within the range comprising a first speed stage, a second speed stage and a third speed stage depending upon a quantity of depressing operation of the acceleration pedal 120, while in case where the speed stage shifting lever 112 is actuated to, e.g., a position "2", an automatic speed changing operation can be performed within the range comprising a first speed stage and a second speed stage depending upon a quantity of depressing operation of the acceleration pedal 120. Similarly, in case where the speed stage shifting lever 112 is actuated to other position, the range in which an automatic speed changing operation is performed can be set in the same manner in conformity with the aforementioned rule.

Figure 4:
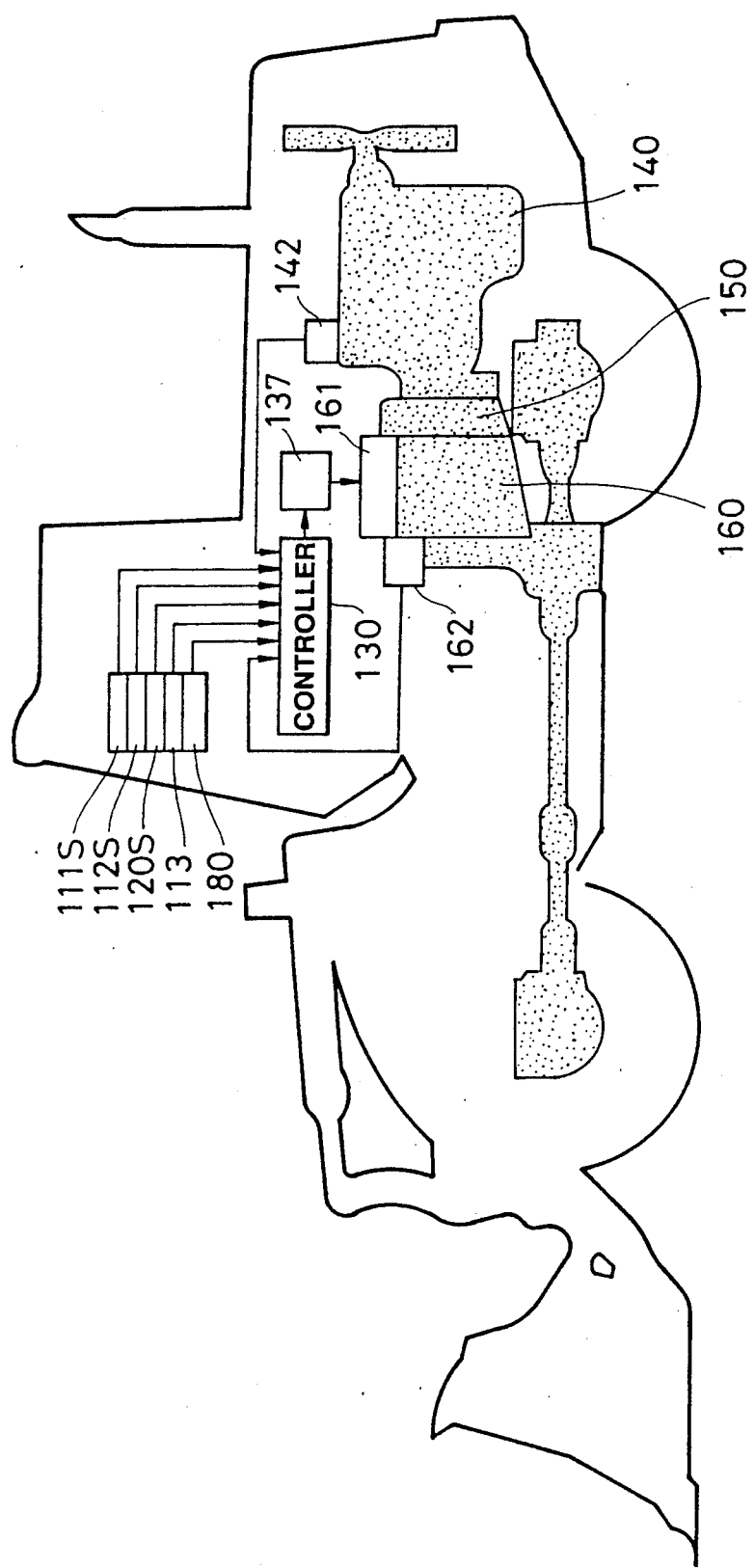
FIG. 4 is a view schematically illustrating a manner of arranging a variety of sensors in case where the automatic speed changing apparatus is employed for a wheel loader.

FIG. 4 schematically illustrates how essential components inclusive of these various sensors and switches constituting the automatic speed changing apparatus are arranged in the wheel loader and how they are operatively associated with each other.

In FIG. 4, reference numeral 130 designates a controller, reference numeral 137 is a solenoid valve driving circuit to be controlled by the controller 130, reference numeral 140 is an engine, reference numeral 142 is an engine speed detecting sensor for detecting the current engine speed, reference numeral 150 is a clutch and reference numeral 162 is a vehicle speed detecting sensor for detecting the current speed of movement of the wheel loader. Other components and units have been already described above.

Figure 5:
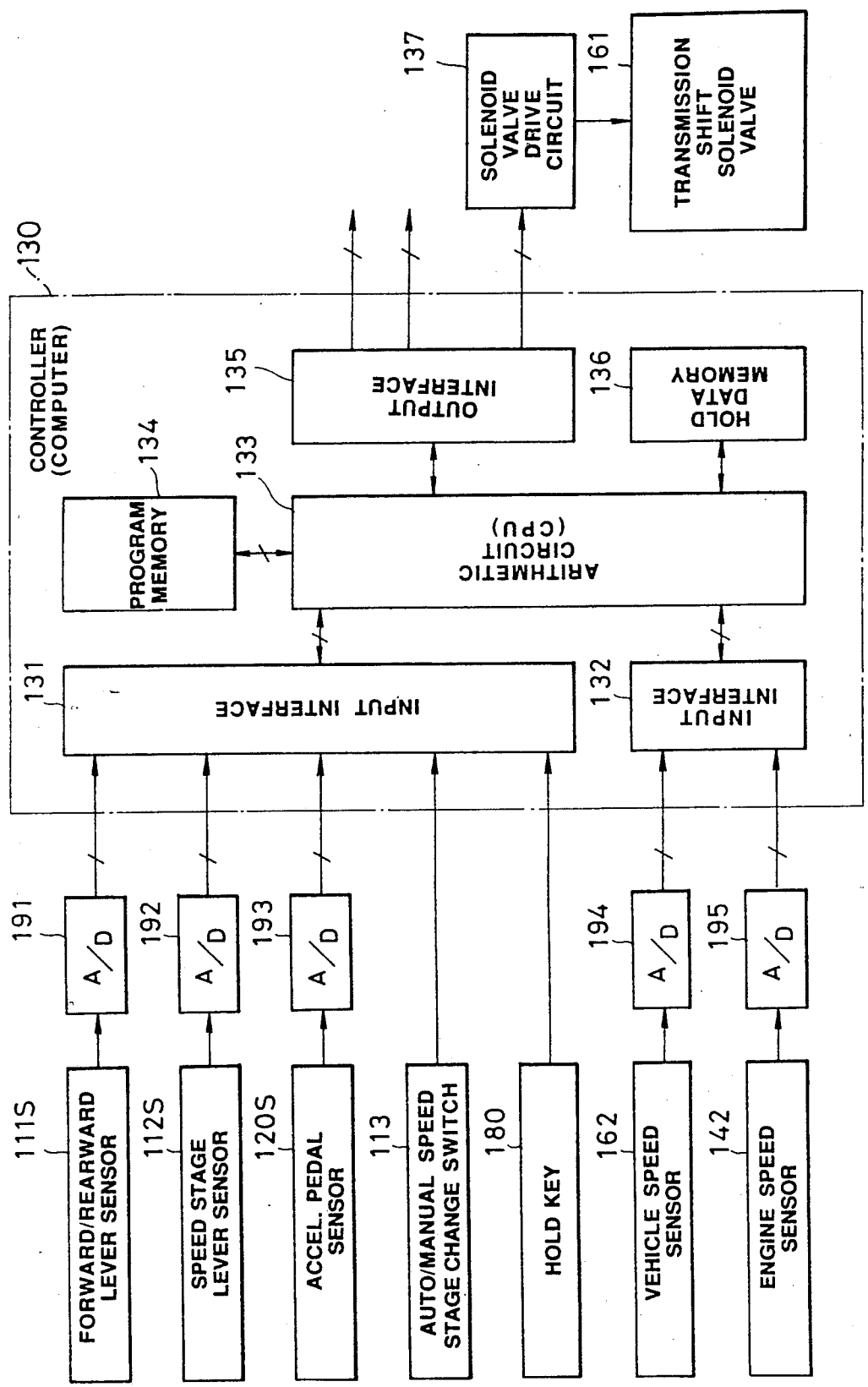
FIG. 5 is a block diagram illustrating by way of example the electrical structure of portions relating mainly to a hold processing to be performed by the automatic speed changing apparatus.
Figure 6:
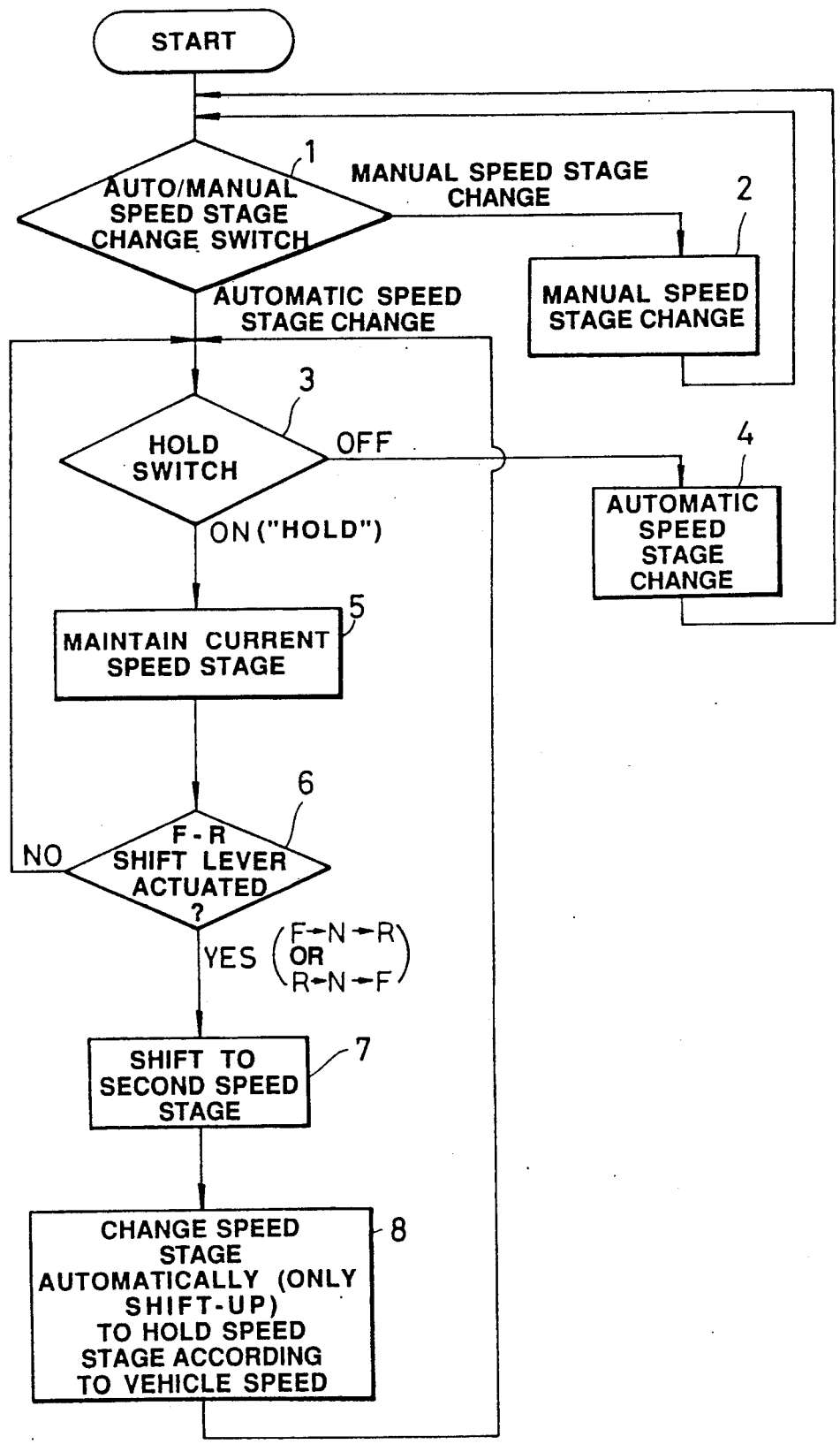
FIG. 6 is a flowchart illustrating a manner of performing mainly a hold processing ("hold" mode processing") in the automatic speed changing apparatus and FIG. 7 is a view schematically illustrating an automatic speed changing apparatus in accordance with other embodiment of the present invention in case where the present invention is applied to the conventional apparatus (system) as shown in FIG. 1.

FIG. 5 illustrates a structure of the automatic speed changing apparatus by showing how the aforementioned components and units are electrically connected to each other and FIG. 6 illustrates by way of flowchart a manner of performing operations in connection with the aforementioned hold mode processing. Structure and operations of the automatic speed changing apparatus will be described below with reference to FIGS. 5 and 6.

Informations on detected positions derived from the forward movement/rearward movement shifting lever position detecting sensor 111S, the speed stage shifting lever position detecting sensor 112S and the acceleration pedal position detecting sensor 120S are converted into digital signals by A/D (analogue/digital) converters 191, 192 and 193 so that they are inputted into the controller (computer) 130. Additionlly, the content of actuations of the automatic speed changing/manual speed changing shifting switches 113 and the hold switch 180 is likewise inputted into the controller 130 in the form of a binary signal. The controller 130 is operated such that these inputted signals are introduced into an arithmetic circuit (CPU) 133 via a first input interface 131.

On the other hand, detected informations derived from the vehicle speed detecting sensor 162 and the engine speed detecting sensor 142 are converted into digital signals by A/D converters 194 and 195 so that they are inputted into the controller 130. The controller 130 is operated such that these inputted signals are introduced into the arithmetic circuit 133 via a second input interface 132.

The arithmetic circuit (CPU) 133 is a circuit in which a variety of signals inputted via the input interfaces 131 and 132 in accordance with a processing program previously stored in a program memory 134 are processed as required and the solenoid valve driving circuit 137 for driving the transmission shift solenoid 161, an electronic governor (not shown) for controlling a rotational speed of the engine 140, a solenoid valve (not shown) for turning on and off the clutch 150 and other associated components are controlled so as to match the content of actuations of the levers 111 and 112, the pedal 120 and the switches 113 and 180 executed by an operator. Control signals outputted from the arithmetic circuit 133 are transmitted via an output interface 135 to respective circuits to be controlled.

A hold data memory 136 incorporated in the controller 133 is a memory in which when the hold switch 180 is shifted to an ON side, control data to be given to the solenoid valve driving circuit 137 from the arithmetic circuit 133 at this time point, i.e., a speed stage command to be issued at this time point is stored. While the hold switch 180 is shifted to the ON side in that manner, the subsequent controlling and processing are executed in the arithmetic circuit 133 in accordance with the manner as represented by a step 5 and subsequent steps in a flowchart shown in FIG. 6.

Specifically, as shown in FIG. 6, in case where the automatic speed change/manual speed change shifting switch 113 is shifted to, e.g., an OFF side so that "manual speed changing" is designated, the arithmetic calculating circuit 133 makes a determination that automatic speed changing has been designated (step 1 in FIG. 6) so that controlling and processing are executed in accordance with a hitherto known "manual speed changing" mode in response to detection of an actuation position of the speed stage shifting lever 112 (step 2 in FIG. 6). In case where the hold switch 180 is shifted to the OFF side while the switch 113 is shifted to the ON side to designate "automatic speed change" (step 1 in FIG. 6), the arithmetic circuit 133 makes a determination that the hold switch 180 has been shifted to the OFF side (step 3 in FIG. 6), controlling and processing are executed in accordance with "automatic speed changing" mode on the basis of the automatic speed change range designated and set by the speed stage shifting lever 112 in the above-described manner in response to detection of a depressing position of the acceleration pedal 120 (step 4 in FIG. 6). However, in the case where the hold switch 180 is shifted to the ON side in that way while the switch 113 has been already shifted to the ON side, the arithmetic circuit 133 stores in the hold data memory 136 control data (speed stage command) to be given to the solenoid valve driving circuit 137 at this time point and then controls the solenoid valve driving circuit 137 in conformity with control data to be later stored in the hold data memory 136. This permits a speed stage selected in accordance with the current mode, i.e., "automatic speed changing" mode at this time point to be maintained in the transmission 160 (step 5 in FIG. 6).

When forward movement/rearward movement is shifted via the forward movement/rearward movement shifting lever 111 while such "hold" mode is maintained, the arithmetic circuit 133 makes a determination that the forward movement/rearward movement has been shifted in that way (step 6 in FIG. 6). Then, when the vehicle starts its movement (in either the forward movement or rearward movement), the transmission shifting solenoid valve 161 is first controlled via the solenoid valve driving circuit 137 so that the transmission 160 is forcibly shifted and changed to a second stage (step 7 in FIG. 6). Thereafter, controlling is executed for acceleration and selection of speed stage in accordance with "automatic speed changing" mode in correspondence to an extent of depressing of the acceleration pedal 120 until a control command value to be given to the solenoid valve driving circuit 137 reaches the command value (control data) stored in the hold data memory 136 (step 8 in FIG. 6). When the control command value to be given to the solenoid valve driving circuit 137 reaches the command value stored in the hold data memory 136, the arithmetic circuit 133 makes a determination that the control command value has reached the command value stored in the hold data memory 135 and thereafter the program automatically goes to the processing at the step 5, i.e., a processing of controlling the solenoid valve driving circuit 137 in accordance with the control data (control command value) stored in the hold data memory 136. Such processing to be executed by the arithmetic circuit 133 continues until the hold switch 180 is disconnected, i.e., until the hold switch 180 is shifted to the OFF side.

Thus, with the automatic speed changing apparatus as constructed according to the embodiment, a hold processing is brought in such a sate that it automatically continues in response to actuation of the hold switch 180. Thereafter, speed of the vehicle is automatically changed to the movement speed at a required speed stage which has been held in that way, when movement of the vehicle is shifted from forward movement to rearward movement and vice versa. Consequently, with the automatic speed changing apparatus of the present invention, any operation can be performed at a high efficiency with an operator's load reduced remarkably using a vehicle such as the illustrated wheel loader or the like of which movement is often shifted from forward movement to rearward movement and vice versa.

Further, with the automatic speed changing apparatus of the present invention, in case where movement of the vehicle is shifted from forward movement to rearward movement and vice versa after the hold switch 180 is actuated, shift control (shift change) is once forcibly carried out to a second speed stage, when the current speed stage is automatically shifted to a required speed stage which has been held in that way, i.e. when the vehicle starts its movement in accordance with the "hold" mode irrespective of forward movement or rearward movement. Thereafter, when the speed stage reaches a required speed stage which has been held in that way as the vehicle speed is increased, the speed stage is automatically maintained at the above required speed stage by executing the hold processing. Consequently, when vehicle movement is attained at the required speed stage after the vehicle movement is shifted from forward movement to rearward movement and vice versa, shifting to the required speed stage can always be performed stably and smoothly.

Incidentally, this embodiment has been described above with respect to an automatic speed changing apparatus on the assumption that a rotational speed of the engine 140 is controlled by means of an electronic governor but the present invention should not be limited only this. Alternatively, the engine may be controlled by employing other suitable method. Further, it should of course be understood that the present invention should not be limited only to the foregoing unit.

According to the embodiment, detection is made by the acceleration pedal position detecting sensor 120S as to whether the vehicle is held at the moving state or not but such detection can practically be made by monitoring the rotational speed of the engine 140. In case where recognition is additionally made on the basis of a detection signal generated by the engine speed detecting sensor 142, the automatic speed changing apparatus may be constructed with the acceleration pedal position detecting sensor 120S and the A/D converter 193 removed therefrom.

Figure 1:
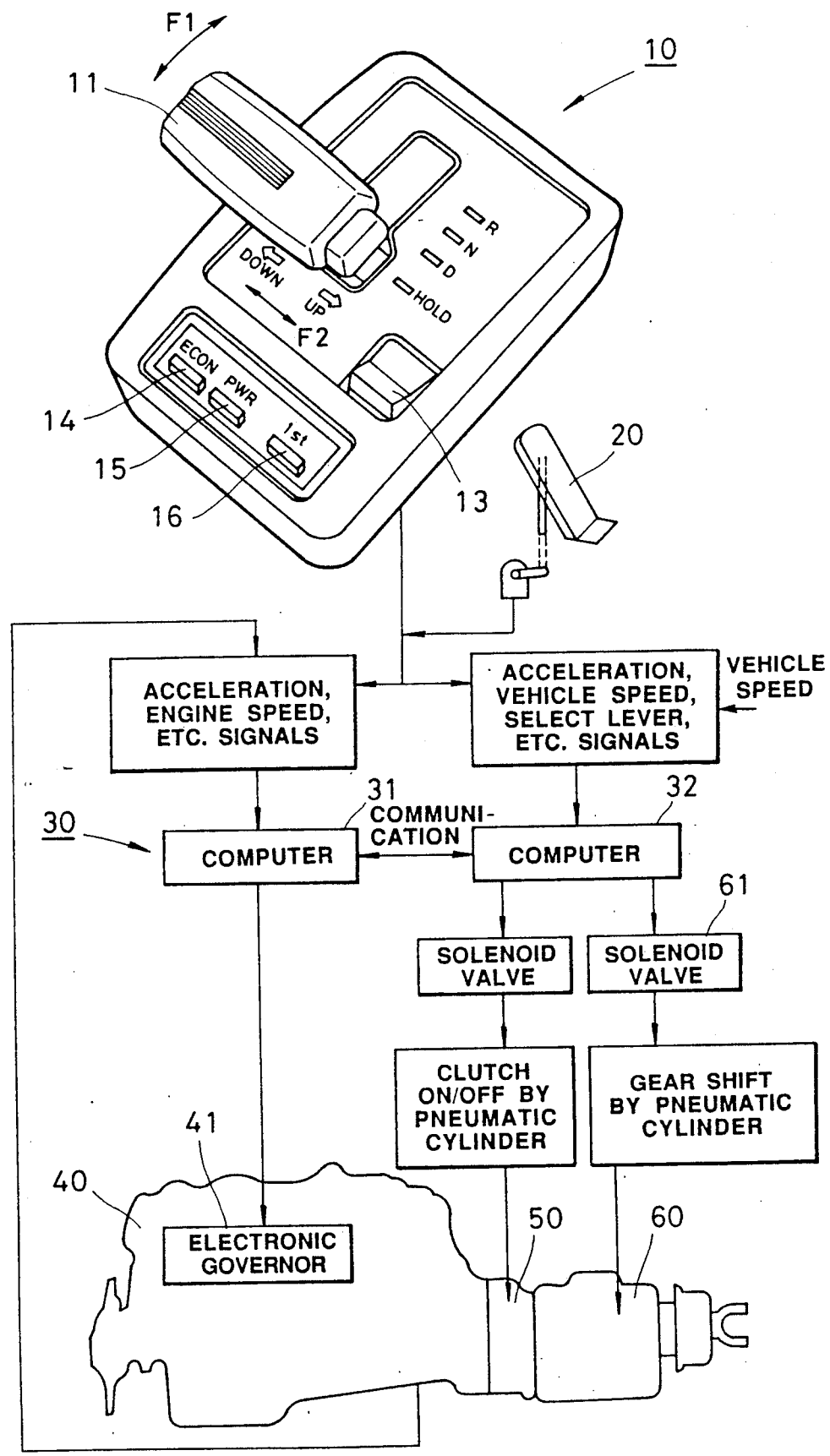
FIG. 1 is a view schematically illustrating by way of system diagram a conventional automatic speed changing apparatus employable for a vehicle.
Figure 2:
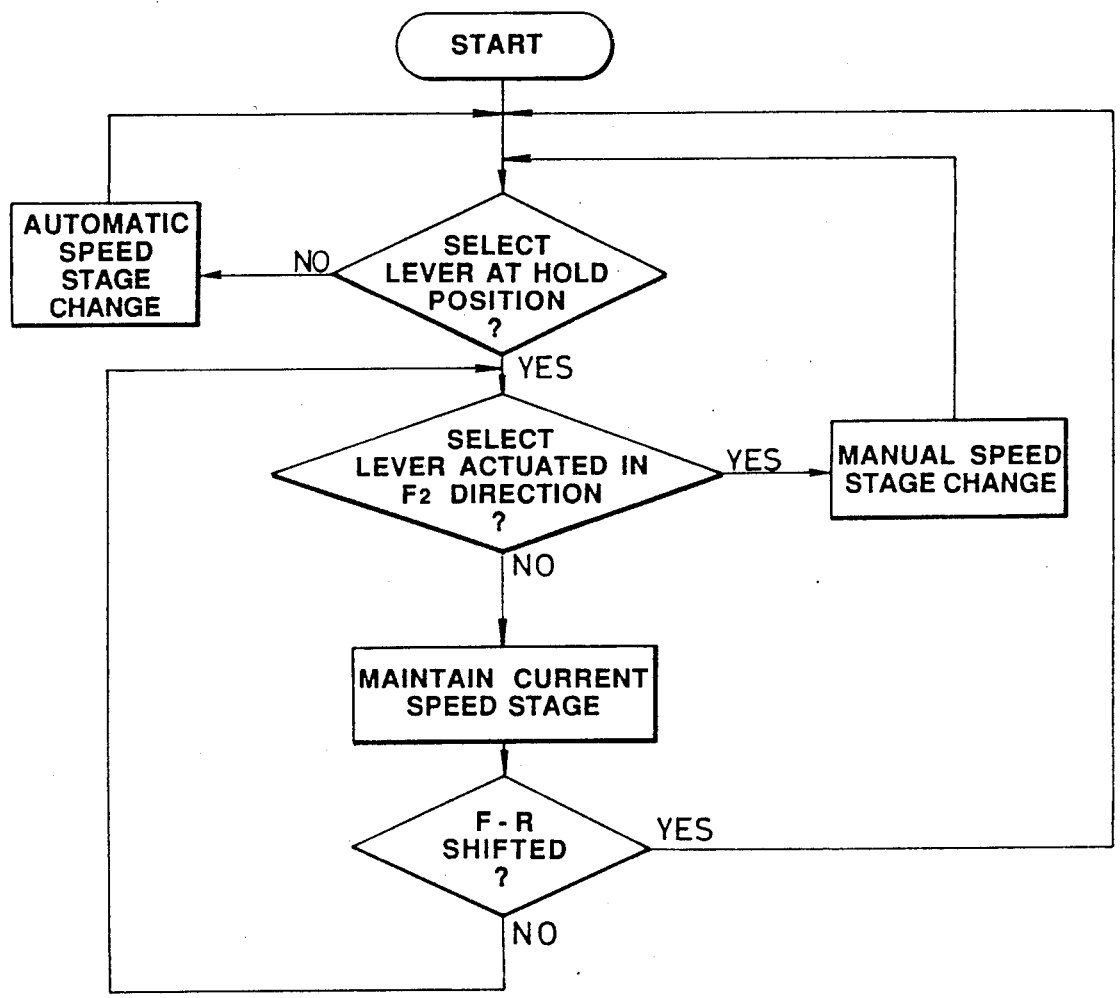
FIG. 2 is a flowchart illustrating performing a plurality of processings, particularly a hold processing using the automatic speed changing apparatus shown in FIG. 1.

For the convenience of description, structure and operation of the automatic speed changing apparatus have been described above as to the case where the embodiment of the present invention is applied to the existent steering apparatus as well as the existent automatic speed changing apparatus employable for a wheel loader or the like vehicle. However, the present invention can likewise be applied to the automatic speed changing apparatus as shown in FIG. 1. One example will be shown in FIG. 7.

Figure 7:
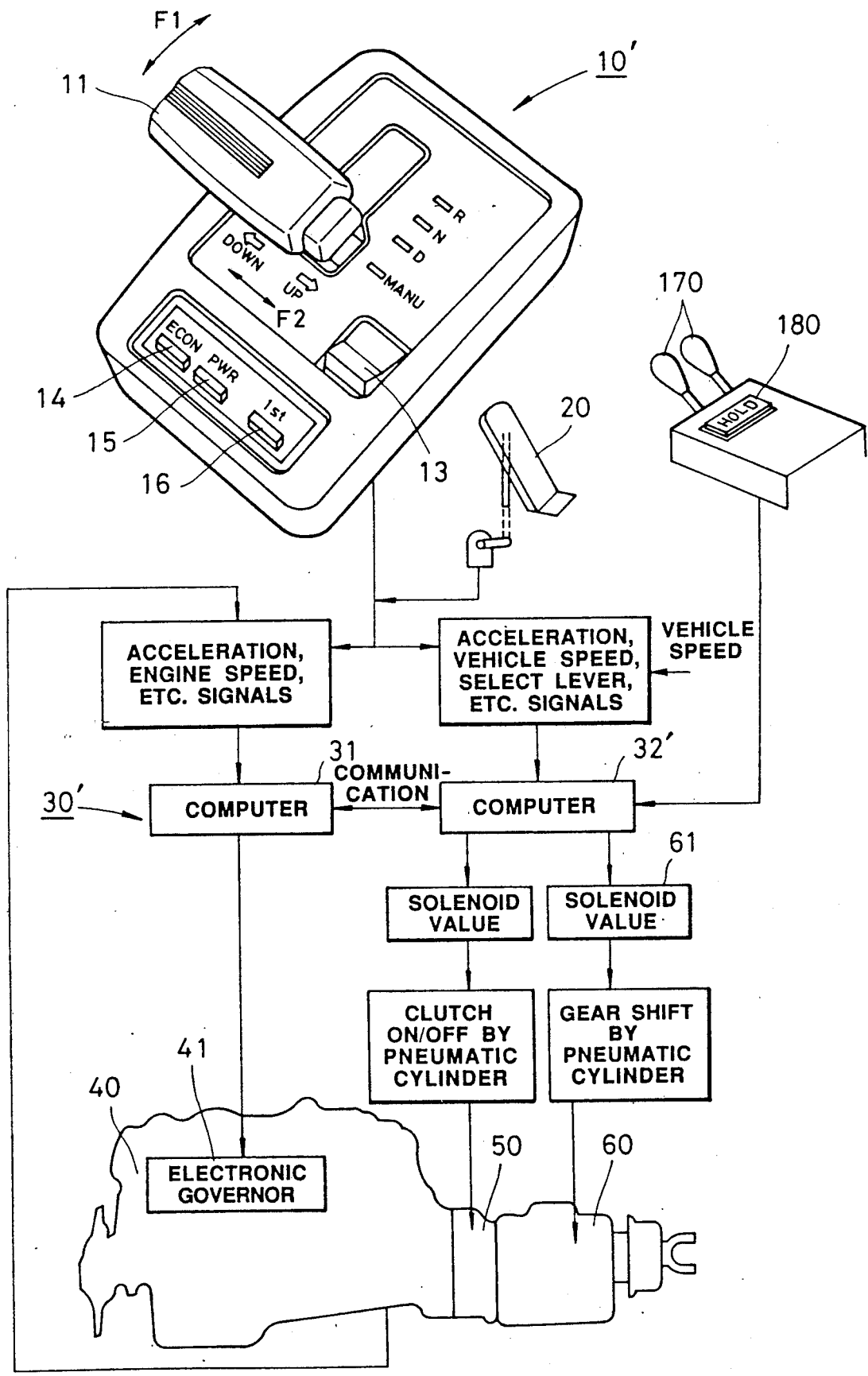

Specifically, with the automatic speed changing apparatus shown in FIG. 7, a select lever device 10' is a device adapted to issue a command as to one of "R (rearward movement)", "N (neutral)" and "D (forward movement)" as well as "automatic speed changing" mode or "manual speed changing" mode in the same manner as the select lever device 10 in FIG. 1, when the vehicle starts its movement. A difference point from the select lever device 10 shown in FIG. 1 consists in that the select lever device 10' does not have a function of commanding a hold processing as mentioned above. A command as to whether a hold processing is required or not is issued in response to actuation of a hold switch 180 arranged separately. In the case of the select lever device 10', it is assumed that only a command for the "manual speed changing" mode is issued, when a select lever 11 is shifted to a "MANU" position (representing a manual position).

In FIG. 7, reference numeral 170 designates a working machine actuating lever as described hereinbefore. The working machine actuating lever 170 is removed from the automatic speed changing apparatus in case where the vehicle is a passenger car, a truck or the like.

In this automatic speed changing apparatus, a controller 30' has functions equal to those of the controller 30 according to the preceding embodiment shown in FIG. 5 so that when a "hold" mode is designated via the hold switch 180, a step 6 and subsequent steps as shown in FIG. 6 which represents a flowchart are repeatedly executed in the same manner as in the preceding embodiment.

Accordingly, also with the automatic speed changing apparatus shown in FIG. 7, an operation can be performed at a high efficiency with an operator's load remarkably reduced using a vehicle such as a wheel loader or the like of which movement is often shifted from forward movement to rearward movement and vice versa. When the vehicle moves at a required speed stage which has been previously held, shifting to the required speed stage can always be effected stably and smoothly.

With respect to each of the aforementioned embodiments, a position where the hold switch 180 is located and a manner of arranging the hold switch 180 can be determined arbitrarily. Provided that the position and the manner are determined such that the hold switch 180 can be actuated independently of other actuating levers, the hold switch 180 may be arranged at any position in accordance with any manner.

The foregoing embodiments have been described above as to the case where a computor is used as a controller and a series of controlling operations for automatic speed changing inclusive a hold processing are executed using the computor. Alternatively, the computor may, of course, be constructed in the form of a so-called hardware circuit so that the same controlling operations for automatic speed changing as mentioned above are executed using the hardware circuit.

INDUSTRIAL APPLICABILITY

As will be apparent from the above description, according to the present invention, movement of a vehicle can immediately be achieved in any case in an automatic manner at a required speed stage which has been previously determined. Thus, a work can be performed at a high efficiency using a construction machine such as a wheel loader or the like of which movement is repeatedly shifted from forward movement to rearward movement and vice versa.

I claim:

1. An automatic speed changing apparatus for a vehicle including at least a forward movement/rearward movement shifting lever for shifting movement of said vehicle from forward movement to rearward movement and vice versa so that when said forward movement/rearward movement shifting lever is actuated to either of forward movement and rearward movement, a speed stage of the vehicle is automatically selected to match the movement speed of the vehicle at this time point, said automatic speed changing apparatus comprising:
   a hold switch adapted to be actuated independently of the forward movement/rearward movement shifting lever and for instructing whether or not a speed stage selected at this tiem point is to be maintained in response to actuation of said hold switch to an ON or an OFF position; and
   a controller for storing and maintaining control data on the speed stage automatically selected at this time point in response to actuation of said hold switch to an ON position and then automatically maintaining the selected speed stage with the use of the stored and maintained control data until the hold switch is actuated to an OFF position.

2. An automatic speed changing apparatus for a vehicle including at least a forward movement/rearward movement shifting lever for shifting movement of said vehicle from forward movement to rearward movement and vice versa so that when said forward movement/rearward movement shifting lever is actuated to either of forward movement and rearward movement, a speed stage of the vehicle is automatically selected to match the movement speed of the vehicle at this time point, said automatic speed changing apparatus comprising:
   a hold switch adapted to be actuated independently of the forward movement/rearward movement shifting lever and for instructing whether or not a speed stage selected at this time point is to be maintained in response to actuation of said hold switch to an ON or an OFF position; and
   a controller for storing and holding control data on the speed stage automatically selected at this time point in response to actuation of said hold switch to an ON position and then automatically maintaining the selected speed stage with the use of the stored and maintained control data until the hold swich is actuated to an OFF position and automatically maintaining the selected speed stage when the forward movement/rearward movement shifting lever is shifted from the forward movement to the rearward movement or vice versa while the hold switch is shifted to the ON position, wherein the speed stage is first forcibly controlled to a second speed stage and thereafter when the vehicle speed is accelerated, the speed stage is shifted up to the speed stage being automatically held as time elapses.

* * * * *